US006895327B2

(12) United States Patent
Braun et al.

(10) Patent No.: US 6,895,327 B2
(45) Date of Patent: May 17, 2005

(54) TELEMATICS PROCESS FOR HELICOPTERS

(75) Inventors: Guenter Braun, Deisenhofen (DE); Helmut Klausing, Wessling-Hochstadt (DE)

(73) Assignee: EADS Deutschland GmbH, Ottobrunn (DE)

( * ) Notice: Subject to any disclaimer, the term of this patent is extended or adjusted under 35 U.S.C. 154(b) by 145 days.

(21) Appl. No.: 10/220,338

(22) PCT Filed: Feb. 28, 2001

(86) PCT No.: PCT/EP01/02203

§ 371 (c)(1),
(2), (4) Date: Dec. 2, 2002

(87) PCT Pub. No.: WO01/65273

PCT Pub. Date: Sep. 7, 2001

(65) Prior Publication Data

US 2003/0125849 A1 Jul. 3, 2003

(51) Int. Cl.[7] .............................................. G06F 19/00
(52) U.S. Cl. ........................... 701/207; 701/3; 701/117; 701/118; 701/119; 701/301; 455/456.1; 340/988; 340/989; 342/457
(58) Field of Search .............................. 701/3, 117–119, 701/207, 301; 455/456.1; 340/988, 989; 342/457

(56) References Cited

U.S. PATENT DOCUMENTS 5,003,317 A * 3/1991 Gray et al. .................. 342/457
6,771,969 B1 * 8/2004 Chinoy et al. ........... 455/456.1

FOREIGN PATENT DOCUMENTS

| DE | 39 22 086 C | 10/1990 |
|---|---|---|
| DE | 40 34 979 C2 | 11/1990 |
| DE | 41 40 406 A1 | 12/1991 |
| DE | 43 23 511 C | 1/1995 |
| DE | 195 19 066 A1 | 5/1995 |
| DE | 195 25 291 C1 | 7/1995 |
| DE | 195 43 625 C1 | 11/1995 |
| DE | 196 46 954 A1 | 11/1996 |
| EP | 0 911 647 A | 4/1999 |
| WO | WO 91/07036 | 5/1991 |
| WO | WO 96 02905 A | 2/1996 |
| WO | WO 99 40457 A | 8/1999 |
| WO | WO 99 46877 A | 9/1999 |

OTHER PUBLICATIONS

Murakami et al: "Telemedicine Using Mobile Satellite Communication" IEEE Transactions on Biomedical Engineering, US, IEEE Inc. New York, vol. 41, No. 5, May 1, 1994, pp. 488–497, XP000770263, ISSN: 0018–9294.

* cited by examiner

Primary Examiner—Gary Chin
Assistant Examiner—Ronnie Mancho
(74) Attorney, Agent, or Firm—Crowell & Moring LLP

(57) ABSTRACT

The invention relates to a telematics method for helicopters. According to the inventive method, the use spectrum of helicopters which are provided with all-weather flight guidance and obstacle warning systems is enlarged and flight security is further improved by transmitting data and/or speech by means of terrestrial and/or satellite-supported mobile radio telecommunications networks and by connecting to a locating system. Logistics processes of the helicopter operation and of the institutions benefiting from a helicopter use are optimized.

12 Claims, 2 Drawing Sheets

TELEMATICS PROCESS FOR HELICOPTERS

The invention relates to a telematic process for helicopters in combination with an all-weather flight guidance and obstacle warning system, according to the preamble of claim 1, as known, for example, from Patent Documents DBP 3922086 and 4323511.

Telematics is a new technical term which derived from the term "telecommunication" and "informatics" and contains information processing as well as information relaying. Telematics therefore go beyond pure information processing within a transport carrier. Even currently, traffic telematics offer an abundance of application possibilities and, particularly with respect to the resulting possible increased-value services, have an extremely promising future. Here, an important role is played by the interaction between locating—for example, by means of the GPS—and mobile communication by way of satellites or terrestrial mobile radiocommunications networks. As a result of the further development of communications transmission technology in the case of mobile radiocommunications satellite systems as well as in terrestrial mobile radiocommunications (UMTS), larger amounts of information will also be rapidly transmitted in the future, which further increases the number of applications for telematics systems.

The multiple concepts in the field of traffic telematics which exist already today with respect to traffic routing, emergency calling and breakdown systems with data and voice transmission, offer also for the use of helicopters the possibility of a considerable increase in efficiency for a use in all weather conditions. The development of an infrastructure is essential in this case which, in the realm of the service providers—such as emergency call centers—as well as in the realm of communication systems—for example, for satellite mobile radiocommunications systems, such as Iridium, Globalstar and ICO—provides a sufficient task-oriented and spatial coverage. The currently occurring fast growth in the field of mobile radiocommunications terminal equipment considerably stimulates the establishment of this infrastructure.

It is an object of the present invention to adapt a telematics concept to a helicopter operation. This concept improves the helicopter operation which, as a result of all-weather flight guidance and obstacle warning systems—particularly heliradar—can take place at any time, with respect to all occurring operations and thus their efficiency and safety. For the processing and transmission of data and voice, all already existing standardized and system-specific interfaces can consequently be utilized.

This object is achieved by the measures indicated in claim 1. In the subclaims, developments and further developments are indicated; embodiments are explained in the following description; and these explanations are supplemented by the figures of the drawing.

Figure 1:
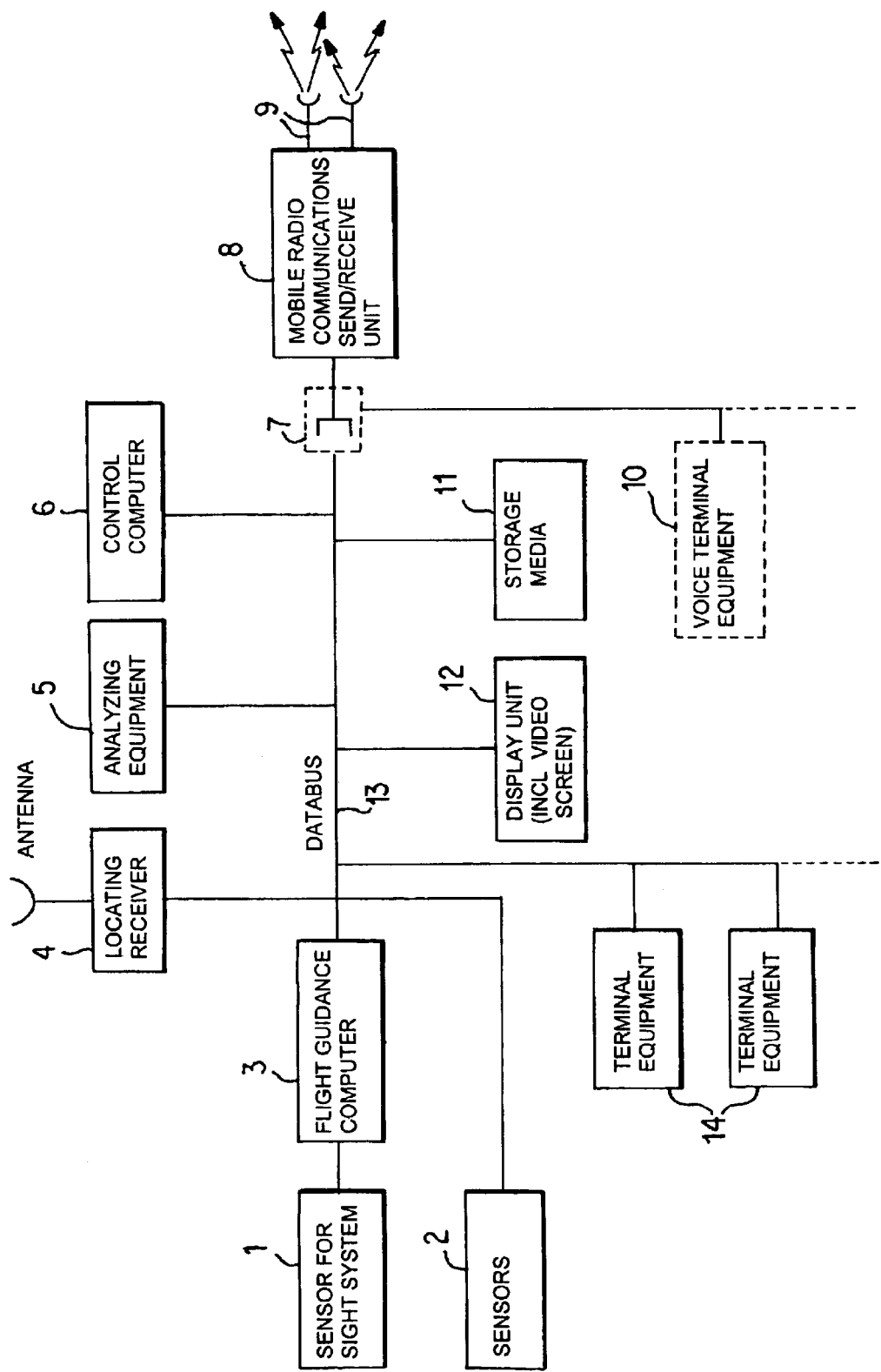
FIG. 1 is a schematic block diagram with respect to an embodiment of the suggested telematics concept.

The process of a telematics concept suggested here permits a plurality of telematics applications during the helicopter operation; thus, before, during and after a specific mission, which will be explained by the following embodiments.

The interaction of locating systems which, like the GPS, are mainly based on satellites, with mobile voice and data transmissions permits the establishment of an effective unit and fleet management which completely or partially carries out an automated transmission of position and operation information between the helicopters and the control center. The operations management or a corresponding control center therefore knows the location of the individual helicopters at any point in time and, in addition, can exchange data, faxes, SMS (short message service), voice information and also video information with these helicopters.

Helicopters which are closest to an actual mission site can therefore be used in a targeted manner by a control center. In this case, by means of a corresponding data exchange, the helicopter can also be selected which is best equipped for the respective operation. This will first take place largely automatically without having to verbally query the crews.

Since, as a rule, helicopters move outside monitored areas or areas to be monitored (air corridors), a continuous precise position determination of helicopters—for example, by means of the GPS—and the position transmission to a control center, even in the case of a high helicopter density, allows an efficient helicopter use without any danger of collisions, even in cases of catastrophes and in poor visibility. By means of an analyzing system in the control center, an automatic warning takes place with respect to dangerous approaches. As an alternative, such an analyzing unit can also be installed without any problem in the helicopter or can be implemented as part of a flight guidance computer—for example, of heliradar—. The prerequisite is only the continuous transmission of all position data from the control center to the helicopters or missiles present in the air space.

Furthermore, the present process permits an automatic, semiautomatic or manually controlled communication with databanks for requesting data relevant to mission purposes and/or flight safety and for transmitting actual data from the surroundings of the helicopter—such as weather, obstacle backdrop, images, etc.—to these databanks and thereby continuously verifying the actual state.

As suggested, in addition to using all-weather flight guidance and obstacle warning systems (heliradar), helicopters will also use digital three-dimensional maps which, interacting with real all-weather sight systems and satellite locating, permit an improved image display. However, three-dimensional maps cannot be maintained in a daily updated state without extremely high expenditures and the currently customary availability by means of CDs provides another drastic limit to an updated condition. By means of the dedicated application of telematic systems, the suggested telematic process can achieve two important improvements. On the one hand, before the start of a mission, a helicopter can now retrieve by mobile radiocommunications all changes which have occurred from the point in time of its last data storage from a databank and thereby update its own database. In order to reduce the transmission expenditures, the helicopter can in this case limit itself to its probable operations area or its actual surroundings determined by locating. Additional data retrievals are also always possible during the flight, so that additional areas can also be updated. On the other hand, the data comparison between a real all-weather sight system and the map data permits a continuous supplementation or correction of the map data which are transmitted by way of telematics back to the central map databank.

In a similar manner as described above, a plurality of other data are used which the helicopter retrieves from additional databanks and, by means of whose updated state, it can inversely also "feed" other databanks. This applies to all data which the helicopter senses by means of the sensor system it carries along. These will primarily be actual weather data or video images which are recorded by optical cameras or radar—as, for example, the installed all-weather sight system. As mentioned above, telematics permit a direct connection with existing earth-bound systems for emergency call and breakdown assistance as well as traffic and guidance systems, which results in a considerable expansion of the information exchange for the benefit of an effective helicopter operation.

Another step of the suggested process is the automatic self-monitoring of the condition of the helicopter and the crew by the regular transmission of the corresponding data to a control center or control station. As a result, servicing, spare part supply, etc. can be planned or prepared in advance.

In the case of helicopter rescue missions, the suggested process allows the transmission of diagnostic patient data for determining a suitable hospital, its preparation for the patient's admission and care, and the providing of specialists for aiding the emergency medical personnel on board the helicopter. This can all already take place during the rescue operation; takes place virtually in seconds by a pure data matching of coded diagnostic facts; and is verified by an automatically initiated establishment of verbal contact. This eliminates a complicated and time-consuming calling of several hospitals. Already during the approach flight, the admitting hospital and possibly additional special clinics— such as eye clinics, etc.—are continuously provided with all patient data in order to thereby initiate and accelerate the primary care. This information may optionally be sent directly to the hospital departments to be participating (surgery, ENT, etc.). In this manner, specialists can also assist the emergency medical personnel on board.

FIG. 1 also shows the equipment-related structure of an embodiment for implementing the suggested telematic process. The data of an optical or radar-assisted sensor 1 for an all-weather sight system are processed in the flight guidance computer 3 and are finally available in the form of images, obstacle representations and warnings as well as general flight information. Optionally, sensors 2 can also detect additional data of the helicopter surroundings. A locating receiver 4 measures the respective actual helicopter position. The analyzing apparatus 5 is used for the comparison of this position with other position information or for the comparison of other data entered in the helicopter (for example, patient data) with databank contents of distant terrestrial terminals 24, 25 or data from storage media on board 11.

However, the selection of the transmission paths can also be implemented by the mobile radiocommunications send/receive unit 8. The analyzing apparatus 5 may also already be implemented in the control computer 6 which controls the helicopter databus 13 and controls all voice and data flows according to a selected sequence. The indicating unit, including the video screen 12, is used essentially for the display of flight information, and the terminal equipment 14 is used for the communication of other data or speech. As an alternative, pure terminal voice equipment 10 can also be connected by way of a corresponding multiplexer 7. The mobile radiocommunications send/receive unit 8 takes over the communication by way of satellite or terrestrial mobile radiocommunications networks and, for this purpose, selects the most suitable transmission paths. The pertaining antennas 9 are switchable and provide an optimal radio link.

Figure 2:
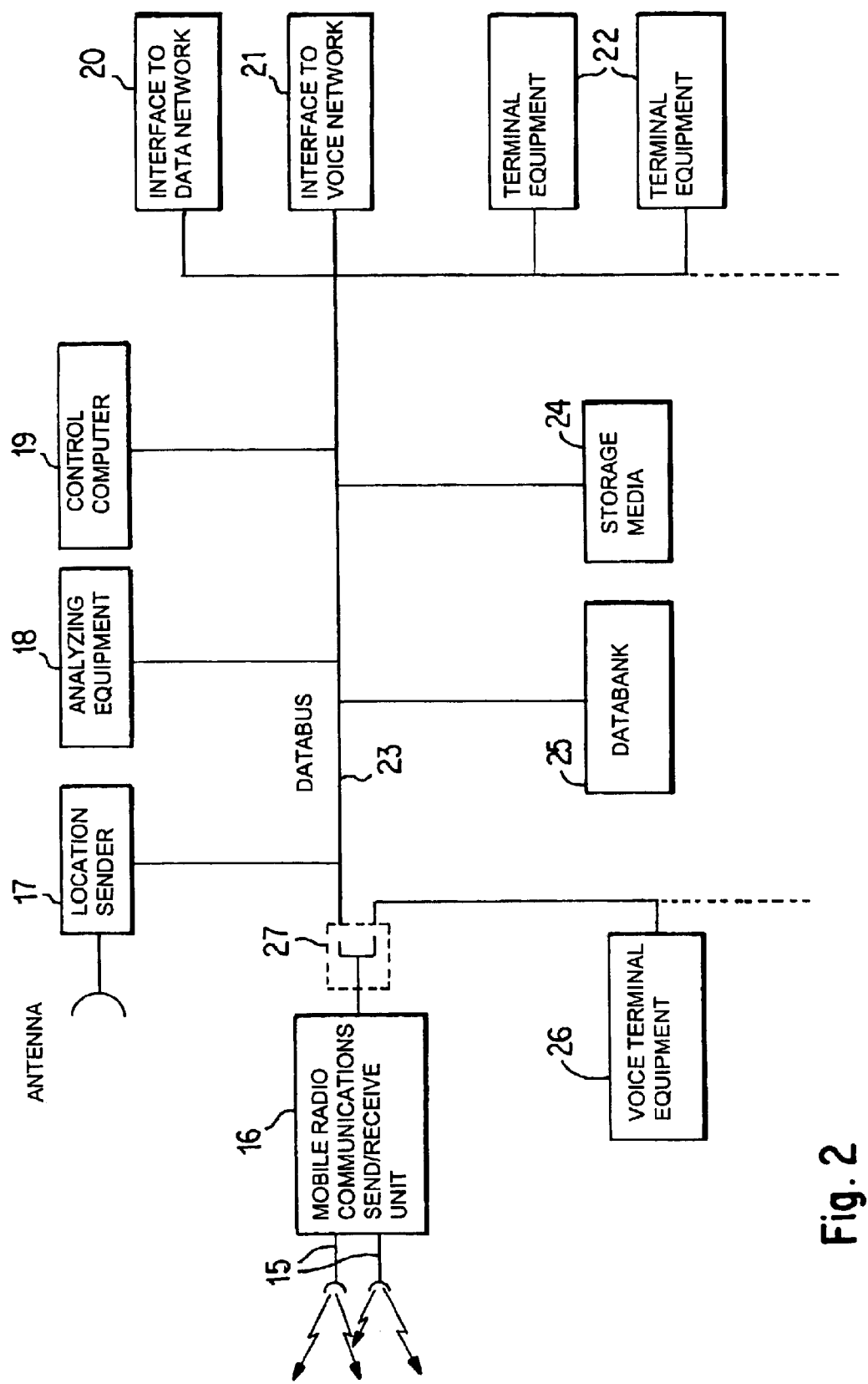
FIG. 2 is a schematic block diagram of an embodiment with respect to a structure of the control centers for the unit and fleet management as well as the flight safety of helicopters, as well as of other control centers, such as emergency call and traffic routing centers or hospitals.

FIG. 2 relates to the possible equipping of control centers for the unit and fleet management as well as to the flight safety of helicopters, to systems for the connection with emergency call and breakdown aids, traffic and guiding systems of all types as well as hospitals for the primary care of patients. Depending on the type of telematics performance and the connected distant terrestrial terminal, the used units, despite having the same name, may implement tasks which deviate from one another.

The mobile radiocommunications send/receive unit 16 of the distant terrestrial terminal comprises an aeronautical station for satellite mobile radiocommunications or another connection to the satellite radiocommunications network as well as a connection to one or several of the existing terrestrial mobile radiocommunications networks. An optional locating transmitter 17 can improve the locating precision of the helicopter and facilitate its approach flight by means of correction information (such as Delta GPS). The analyzing apparatus 18 is used for the comparison of the helicopter position with other position information, or the comparison of other data entered in the helicopter (such as patient data) or otherwise determined data with databank contents 24, 25 or data from an internal or a public data network. The analyzing unit 18 can be implemented in the control computer 19 which controls the databus 23. The terminal equipment 22 is used for the communication of data and/or of speech. As an alternative, pure terminal voice equipment 26 is connected by way of a corresponding multiplexer 27. An interface to the voice network 21 establishes a connection to internal or public communication systems.

What is claimed is:

1. Telematic process for helicopters with an all-weather flight guidance and obstacle warning system which utilizes terrestrial or satellite-assisted mobile radiocommunications networks for the mobile communication, said processing comprising:

establishing a unit and fleet management by completely or partially automated transmission of position and operational information between the helicopter and a control center, using a cooperative association of a locating system with a mobile voice and/or data transmission;

automatically, semiautomatically or manually controlling communication with databanks to retrieve data relevant to mission purposes and/or flight safety, and to transmit actual data from surroundings of a helicopter, including weather data, obstacle backdrop, images, to databanks;

establishing and maintaining an indirect or direct mobile radiocommunications connection to existing earth-bound systems for emergency call and breakdown assistance, traffic and guiding systems system of all types;

transmitting patient diagnostic data for selection of an optimum hospital, its preparation for the primary care as well as for obtaining assistance from specialists for the emergency medical personnel on board; and transmitting data concerning the condition of the helicopter and/or of the crew for an effective mission planning, servicing and spare parts supply.

2. The telematic process according to claim 1, wherein transmission of voice and data communication is implemented via at least one of a terrestrial mobile radiocommunications network and a satellite radiocommunications network.

3. The telematic process according to claim 1, wherein the transmission path or paths is selected based on criteria for quality of transmission and reachability of a distant terminal in an automatic, semiautomatic or manual manner.

4. The telematic process according to claim 1, wherein:

satellite mobile radiocommunications antennas are mounted above a main rotor head and above a rear rotor of the helicopter;

in the case of helicopters without any rear rotor, the satellite mobile radicommunications antennas are mounted close to a rearward helicopter end; and the satellite antennas are utilized both separately and jointly, with spatial and frequency separation, for an optimal radio transmission.

5. The telematic process according to claim 1, wherein:

terrestrial mobile radiocommunications antennas are mounted at highest and lowest points of the helicopter, above a main rotor head and above a rear rotor;

in helicopters without a rear rotor, such antennas are mounted close to the rearward helicopter end as well as on the underside of the helicopter in the front, in the rear and in the center; and the terrestrial mobile radiocommunications antennas are each used separately or jointly, with spatial and frequency separation for optimal radio transmission.

6. The telematic process according to claim 1, wherein the satellite mobile radiocommunications antennas and the upper antennas for the terrestrial mobile radiocommunications are connected with one another or use the same radiator element.

7. The telematic process according to claim 1, wherein:

the lower antennas for the terrestrial radiocommunications have a directional effect; and during a flight, the lower antennas are mechanically or electronically tracked to a radio station.

8. The telematic process according to claim 1, wherein for the purpose of a collision warning, position messages are continuously transmitted to a control center which operates an analyzing system for computing collision risks of the helicopters among one another or with other obstacles whose position is known from information of a digital map or of position messages by radio, or which transmits the position data of all helicopters operating in the area and of low-flying surface airplanes to all traffic participants in the air space, the collision risk being determined by an analyzing system implemented in the helicopter.

9. The telematic process according to claim 1, wherein a road map is added to the process which is vectorized in the GDF format.

10. The telematic process according to claim 1, wherein actual data or transaction data are transmitted from a digital map before and during the mission to the helicopter in order to update its database.

11. The telematic process according to claim 1, wherein:

actual data concerning surroundings of the helicopter are recorded by means of an on-board optical or radar-based real sight system;

the actual data are compared with the digital map; and transaction data are transmitted from the helicopter by way of mobile radiocommunications or storage media to the map databank for updating the obstacle background.

12. The telematic process according to claim 1, wherein actual data of all types sensed by the helicopter by means of sensors are transmitted by way of mobile radio communications or storage media to a databank.

* * * * *